United States Patent
Patton, Jr.

(10) Patent No.: US 7,658,427 B2
(45) Date of Patent: Feb. 9, 2010

(54) IMPACT ABSORBING TAILGATE

(76) Inventor: Roy Chilson Patton, Jr., 102 Northwood Ct., Morganton, NC (US) 28655

( * ) Notice: Subject to any disclaimer, the term of this patent is extended or adjusted under 35 U.S.C. 154(b) by 0 days.

(21) Appl. No.: 11/870,695

(22) Filed: Oct. 11, 2007

(65) Prior Publication Data

US 2009/0096243 A1    Apr. 16, 2009

(51) Int. Cl.
*B62D 33/03* (2006.01)
(52) U.S. Cl. .................. 296/50; 296/57.1; 296/51; 293/117
(58) Field of Classification Search .......... 296/61, 296/62, 187.11, 57.1, 51, 50, 146.8; 293/117
See application file for complete search history.

(56) References Cited

U.S. PATENT DOCUMENTS

| | | | |
|---|---|---|---|
| 3,361,467 A | 1/1968 | Ludwikowski | |
| 4,008,915 A | 2/1977 | Walker | |
| 4,103,284 A | 7/1978 | Blake | |
| D281,061 S | 10/1985 | Tortolani | |
| 4,951,985 A | 8/1990 | Pong et al. | |
| 5,092,012 A * | 3/1992 | Rabourn et al. | 15/97.3 |
| 5,732,995 A * | 3/1998 | Piccariello | 296/57.1 |
| 6,244,637 B1 | 6/2001 | Leonhardt et al. | |
| 6,264,258 B1 | 7/2001 | Li et al. | |
| 6,293,602 B1 | 9/2001 | Presley | |
| 6,364,392 B1 * | 4/2002 | Meinke | 296/62 |
| 6,886,877 B1 * | 5/2005 | Plavetich et al. | 296/57.1 |
| 6,957,840 B1 | 10/2005 | Endres | |
| 6,991,277 B1 * | 1/2006 | Esler | 296/50 |
| 7,182,380 B2 * | 2/2007 | Nagle | 296/26.11 |
| 2005/0067851 A1 * | 3/2005 | Kang et al. | 296/51 |
| 2006/0208519 A1 * | 9/2006 | King | 296/57.1 |
| 2008/0309110 A1 * | 12/2008 | Jones | 296/57.1 |

* cited by examiner

*Primary Examiner*—Jason S Morrow
(74) *Attorney, Agent, or Firm*—Trego, Hines & Ladenheim, PLLC

(57) ABSTRACT

A vehicle tailgate includes a lower section carrying pivots adapted to be mounted to a vehicle bed; an upper section slidingly mounted to the lower section, so as to be able to move between an extended position and a retracted position relative to the lower section; and a biasing device which urges the upper section towards the extended position. The biasing device is selected so as to permit the upper section to move towards the retracted position when a predetermined force is applied.

21 Claims, 6 Drawing Sheets

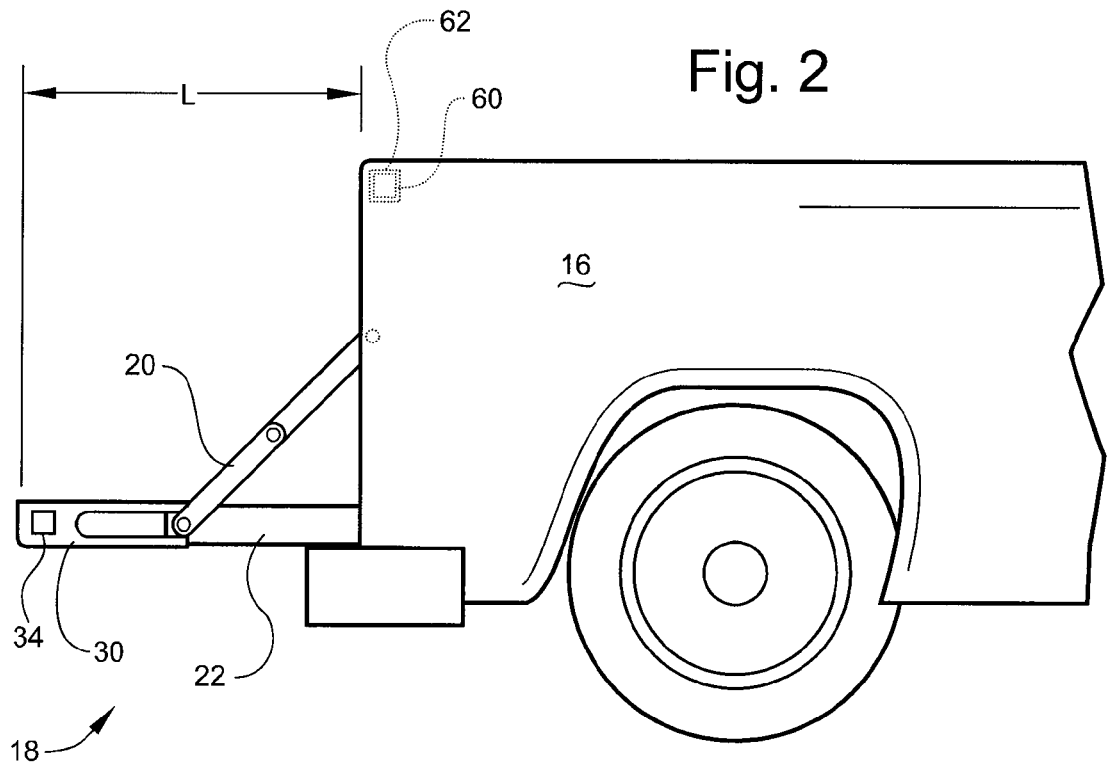
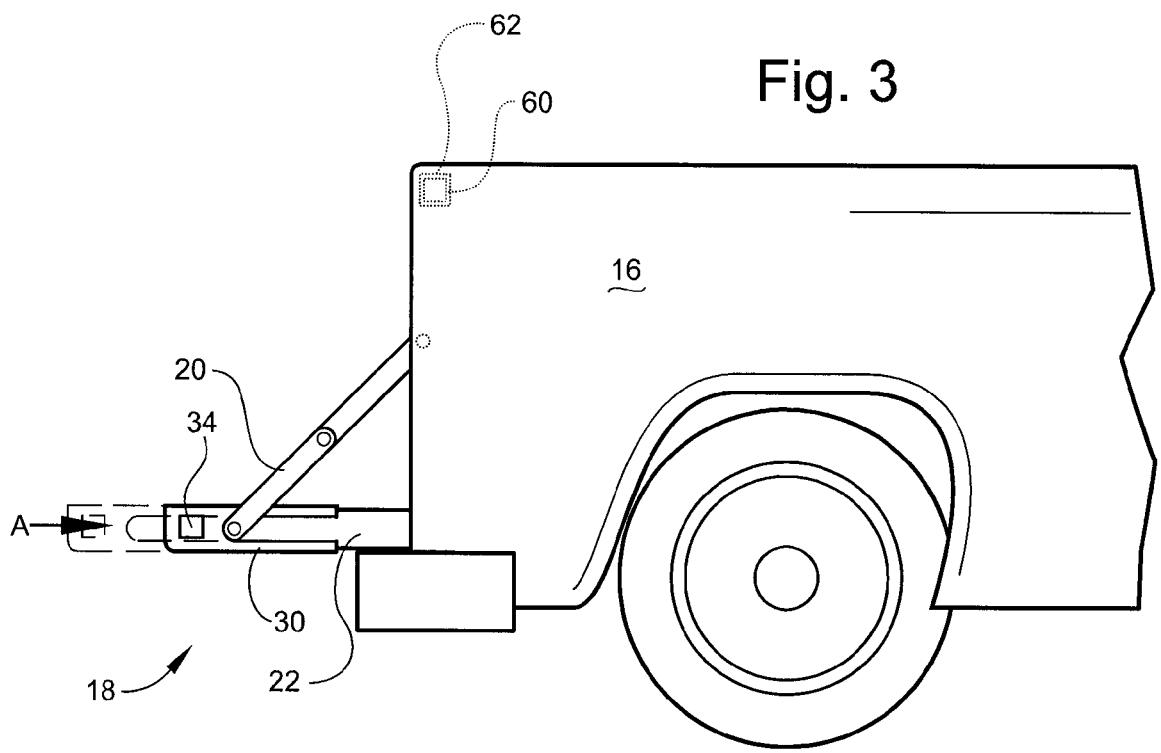

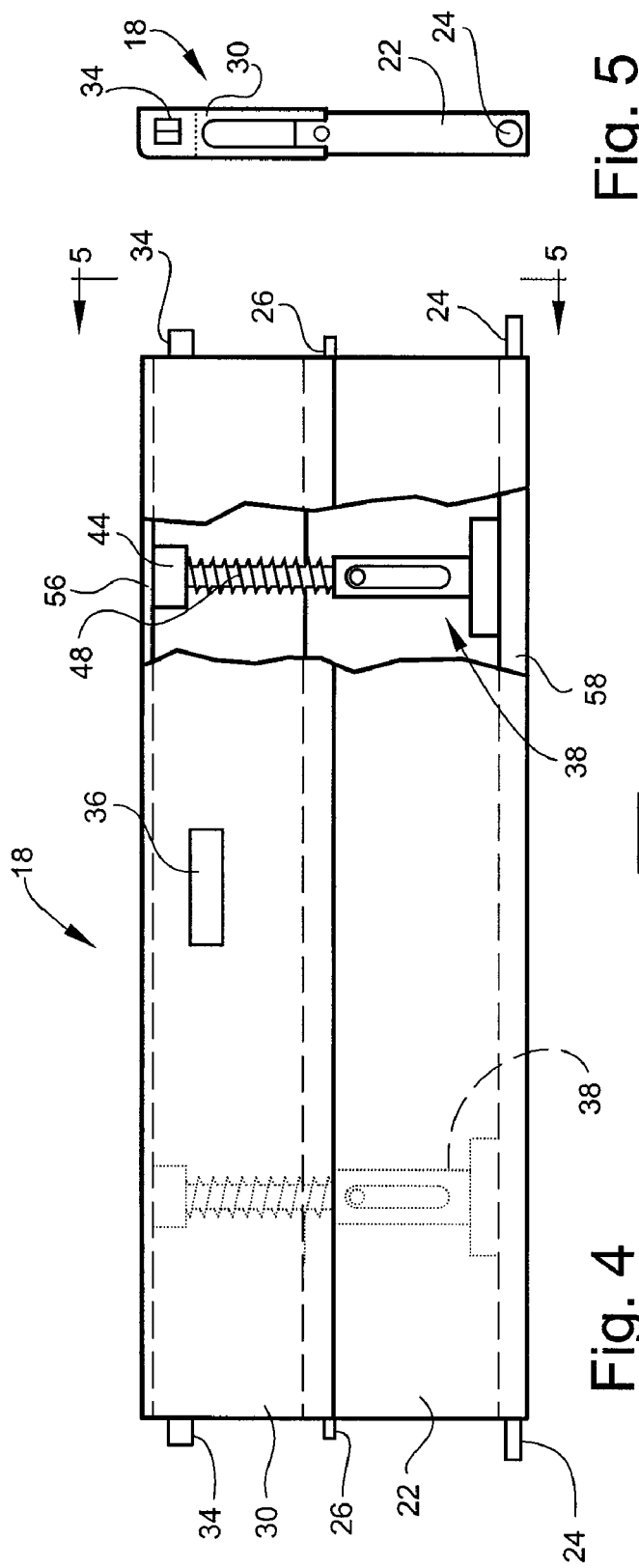
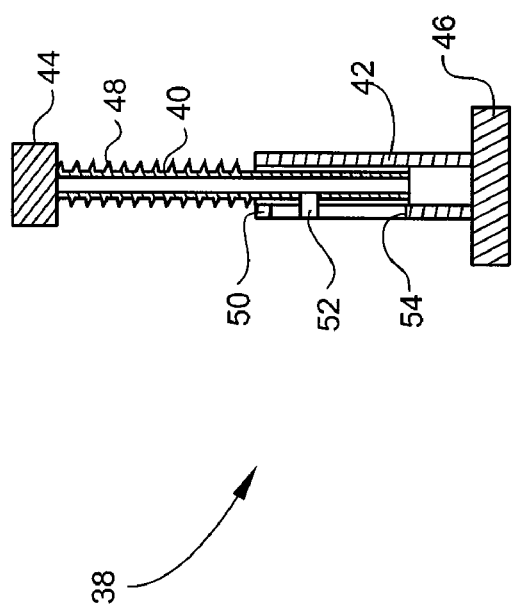
Fig. 4
Fig. 5
Fig. 6

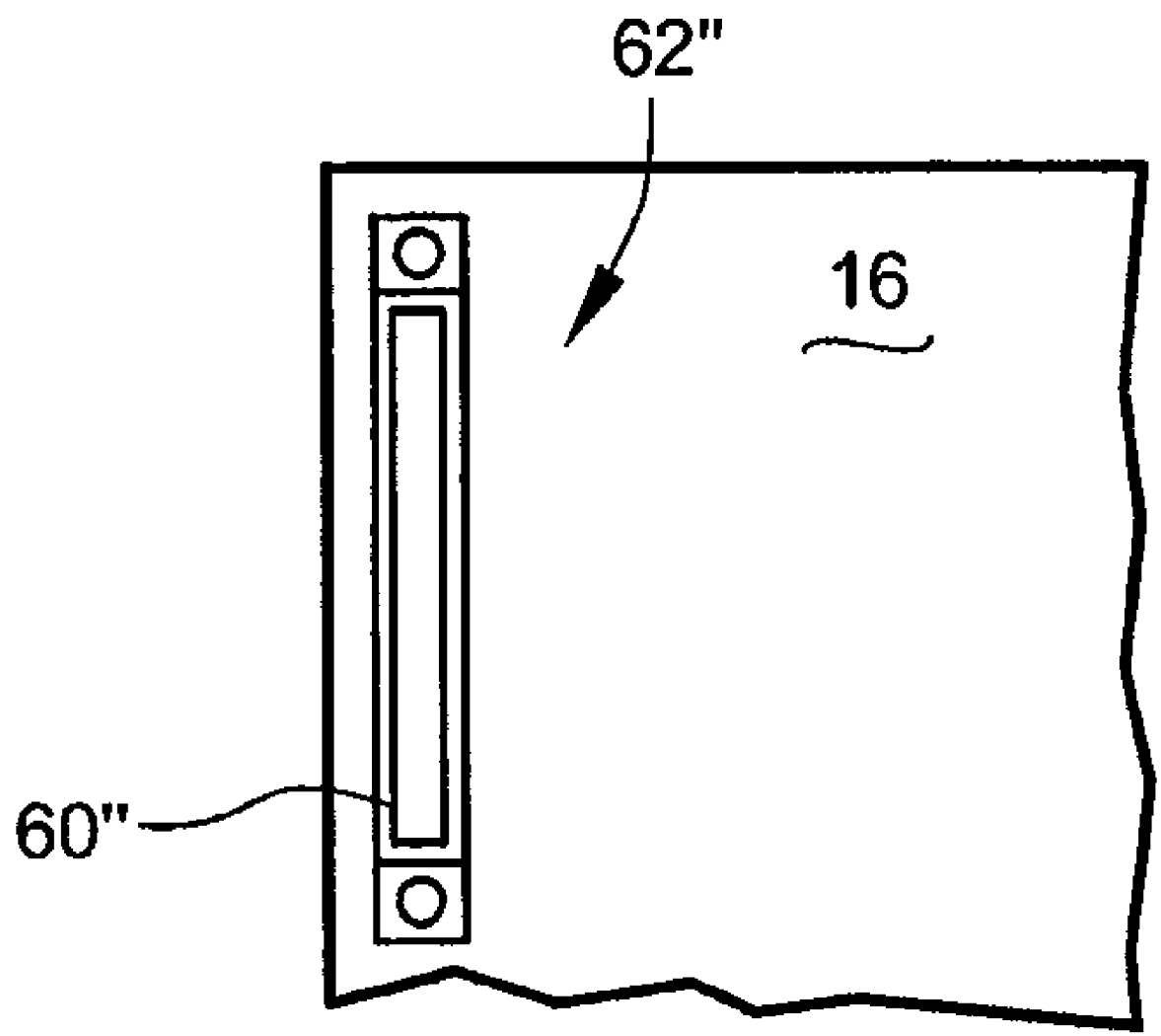

IMPACT ABSORBING TAILGATE

BACKGROUND OF THE INVENTION

This invention relates generally to vehicle tailgates and more particularly to a tailgate which can absorb impacts and rebound from them.

Trucks and other vehicles, in particular "pickup" trucks are frequently equipped with beds or boxes for carrying loads. The rear end of the bed or box is usually closed off by a tailgate which can pivot between an upright closed position for hauling loads, and a generally horizontal open position which facilitates loading and unloading.

Especially when they are used in industry, construction or other commercial work, tailgates are subject to impact hazards in the open position. For example, the vehicle with the tailgate may be backed into posts, buildings, or other objects, or the tailgate may be struck by other vehicles, e.g. forklifts. Over time, the tailgates become too damaged for further use and have to be replaced.

BRIEF SUMMARY OF THE INVENTION

These and other shortcomings of the prior art are addressed by the present invention, which provides a tailgate capable of retracting when pushed or struck.

According to one aspect of the invention a vehicle tailgate includes: a lower section carrying pivots adapted to be mounted to a vehicle bed; an upper section slidingly mounted to the lower section, so as to be able to move between an extended position and a retracted position relative to the lower section; and biasing means for urging the upper section towards the extended position, the biasing means selected so as to permit the upper section to move towards the retracted position when a predetermined force is applied.

According to another aspect of the invention, a vehicle bed assembly includes: a pair of spaced-apart sidewalls; a floor extending between the sidewalls; and a tailgate. The tailgate includes: a lower section carried by the sidewalls so as to be pivotable between an upright, closed position, and a generally horizontal open position; an upper section slidingly mounted to the lower section, so as to be able to move between an extended position and a retracted position relative to the lower section; and biasing means for urging the upper section towards the extended position, the biasing means selected so as to permit the upper section to move towards the retracted position when a predetermined force is applied.

BRIEF DESCRIPTION OF THE DRAWINGS

The invention may be best understood by reference to the following description taken in conjunction with the accompanying drawing figures in which:

FIG. 2 is a side view of the truck of FIG. 1, showing the tailgate in an extended position;

FIG. 3 is a side view of the truck of FIG. 1, showing the tailgate in a retracted position;

FIG. 4 is a partially cut-away rear view of the tailgate of FIG. 1;

FIG. 5 is a view taken along lines 5-5 of FIG. 4;

FIG. 6 is cross-sectional view of a support column of the tailgate;

FIG. 10 is a side view of another alternative latch for use with the tailgate of FIG. 1.

DETAILED DESCRIPTION OF THE INVENTION

Figure 1:
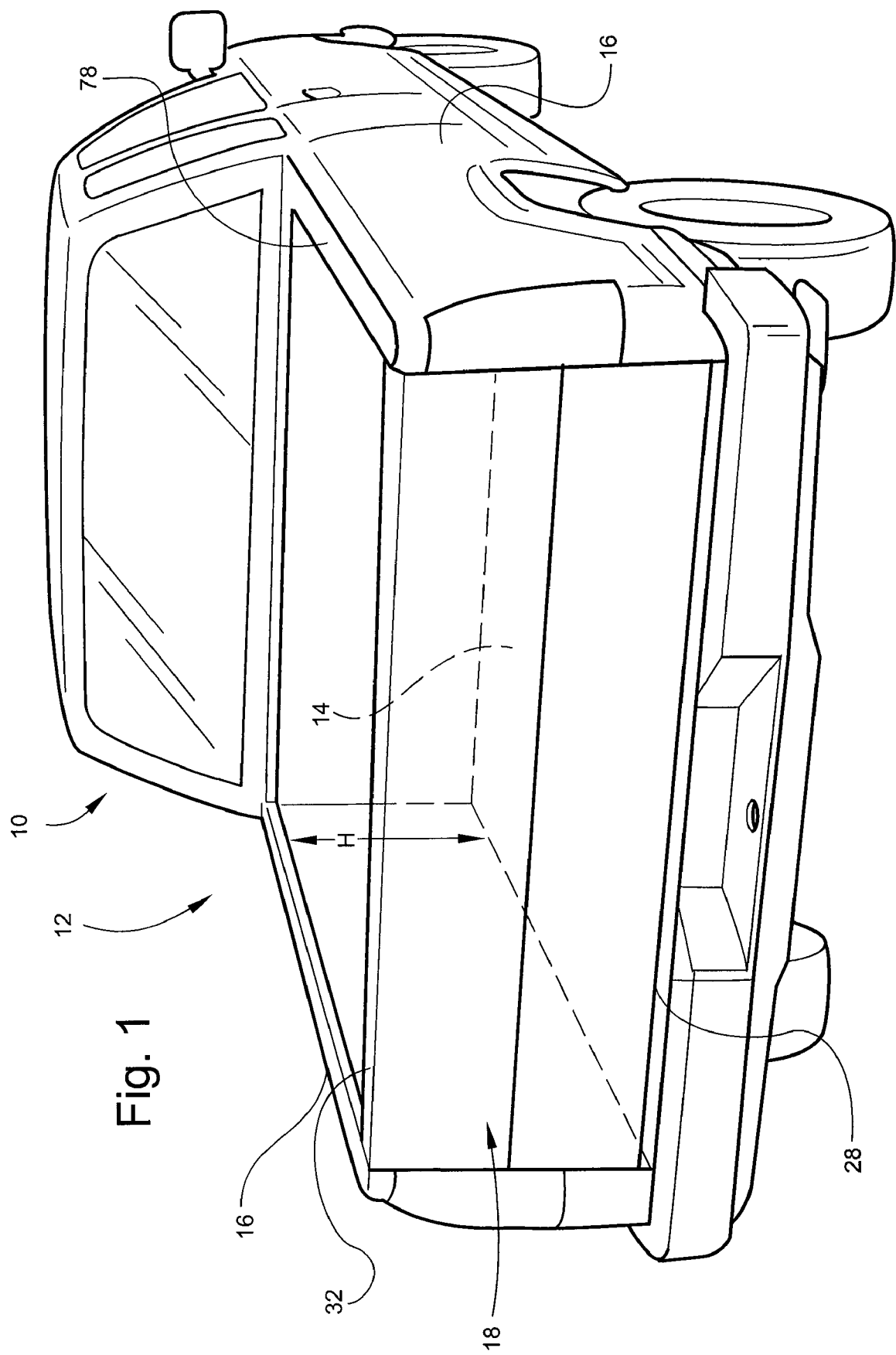
FIG. 1 is a perspective view of a truck including a tailgate constructed according to an aspect of the present invention.

Referring to the drawings wherein identical reference numerals denote the same elements throughout the various views, FIG. 1 depicts a rear portion of a truck 10 having a bed 12 comprising a floor 14 and a pair of spaced-apart sidewalls 16. An exemplary tailgate 18 constructed according to an aspect of the present invention is mounted between the aft ends of the sidewalls 16 so that it can pivot between an upright, closed position (shown in FIG. 1) and a generally horizontal, open position (shown in FIGS. 2 and 3). While the invention is described in the context of a conventional "pickup" truck, it will be understood that the principle of the invention is equally applicable to other types of vehicles having a gate or door with an exposed edge.

FIG. 2 shows the tailgate 18 in the open position. It is supported in this position by one or more folding braces 20 of a known type. Chains, cables, or ropes could also be used for this purpose. In FIG. 2, the tailgate is fully extended and its overall length, denoted "L", is approximately equal to the height "H" of the sidewalls 16 (see FIG. 1), in accordance with conventional practice for pickup trucks. FIG. 3 shows the action of the tailgate 18 when it is subjected to a force in the direction of arrow "A". This could result from backing the truck 10 into a fixed obstacle such as a building or post, or from an impact on the tailgate 18 by another vehicle. When the force is applied, the tailgate 18 collapses into a retracted position so that its total length is less than the extended length L. By giving way in response to the force, the tailgate 18 is protected from damage. This may also reduce or prevent damage to the object in contact with the tailgate 18. When the force or obstacle is removed, biasing means (described below) return the tailgate 18 to the extended position as shown in FIG. 2, and it is ready for further use.

The force required to cause the tailgate 18 to retract should be low enough such that it will retract before it dents or bends, and high enough that the tailgate 18 remains extended during normal operations and does not "rattle" or retract because of normal vehicle maneuvers, such as braking or acceleration. The force required to start retraction may be varied to suit a particular application, depending, for example, on the size of the tailgate 18 and the weight of its components. For example, in a typical pickup truck application the force to start retraction may be set at about 270 N (60 lbs.) to about 445 N (100 lbs.).

FIGS. 4 and 5 illustrate the construction of the tailgate 18 in more detail. it has a box-like lower section 22 which includes pivots 24 (hinge pins which fit mating holes in the bed 12 are illustrated), as well as attachment points 26 for the above-mentioned braces 20. The lower edge of the lower section 22 defines the bottom edge 28 of the tailgate 18 (see FIG. 1). A box-like upper section 30 fits over the lower section 22. The upper edge of the upper section 30 defines the top edge 32 of the tailgate 18 (see FIG. 1). In the illustrated example, the cross-sectional dimensions of the upper section 30 are slightly greater than those of the lower section 22 so as to allow sliding motion between the two components. In this configuration, the upper section 30 acts like an "umbrella" which sheds water off the tailgate 18. However, the opposite configuration (i.e. lower section 22 larger than upper section 30) could also be used. Furthermore, alternative physical configurations of the tailgate 18 may be substituted for the two-part telescoping structure described herein, so long as the tailgate 18 is able to move between extended and retracted positions. The upper section 30 also carries a pair of retractable latch bolts 34, an operating handle 36, and a latch mechanism of a known type (not shown) that retracts the latch bolts 34 when the operating handle 36 is pulled.

Biasing means are provided for urging the tailgate 18 into the extended position. In the illustrated example, a pair of telescoping support columns 38 are installed in the interior of the tailgate 18 between the upper and lower sections 30 and 22. As shown in FIG. 6, the support columns 38 each include inner and outer tubes 40 and 42, and end plates 44 and 46. A spring 48 extends between the upper end plate 44 and a shoulder 50 of the outer tube 42. A pin 52 which is carried by the inner tube 40 rides in a longitudinal slot 54 in the wall of the outer tube 42 and controls the range of motion of the support column 38, and thus limits the motion of the upper section 30 to a predetermined stroke. In the illustrated example, the upper section 30 has a stroke of about 15.24 cm (6 in.), but this may be varied to suit a particular application. Other means such as shock absorbers, cables and pulleys, hydraulic dampeners, directly mounted springs, etc. may be substituted for the support columns 38. In the illustrated example, the support columns 38 are mounted between upper and lower reinforcing rails 56 and 58 which are carried in the upper and lower sections 30 and 22, respectively.

When the tailgate 18 is closed, the latch bolts 34 engage openings 60 in conventional latch plates 62 (see FIG. 2) mounted to the sidewalls 16. This engagement positively holds the tailgate 18 in the extended position so that a load can be placed on the top edge 32 of the tailgate 18, if desired.

Figure 7:
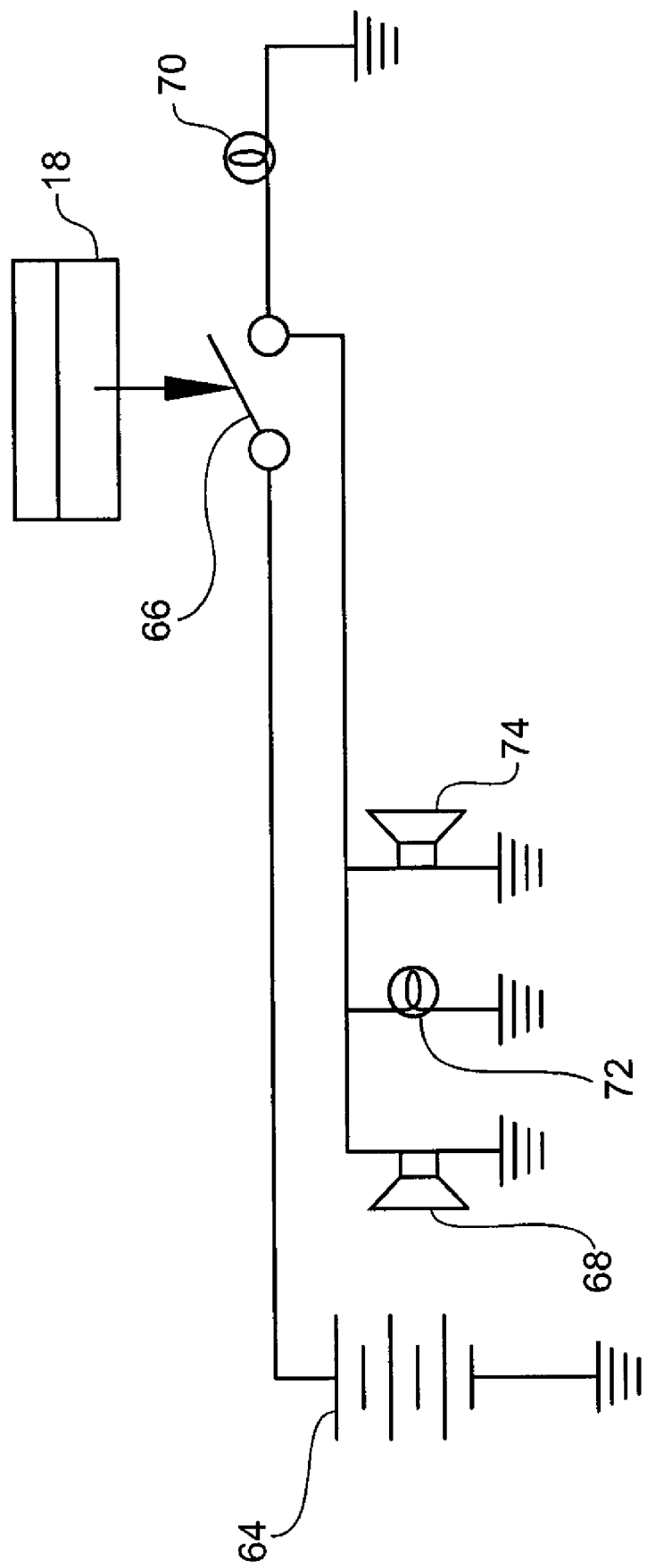
FIG. 7 is a circuit schematic depicting a warning device operated by the tailgate.

Even with the features described above, the tailgate 18 may ultimately be damaged if it is impacted severely, or if the vehicle is moved further after the tailgate 18 has made contact. Therefore, optional means may be provided for warning the vehicle operator, bystanders, or both, than an impact has occurred. FIG. 7 illustrates schematically a circuit that may be used for this purpose. It includes a power source 64 (which may be the vehicle's existing battery), a switch 66 operatively connected to the tailgate 18 and arranged to close when relative motion takes place between the upper and lower sections 30 and 22, and a warning device which is activated when the switch 66 is closed. Non-limiting examples of warning devices include aural devices such as bells, buzzers, alarms, loudspeakers, and voice modules, visual devices such as lights, strobes, and LCD or LED displays, and tactile devices such as vibrators or shakers, and the like. In the illustrated example, the circuit powers the vehicle's horn 68 and taillights 70, an in-cab light 72, and an in-cab buzzer 74.

Figure 8:
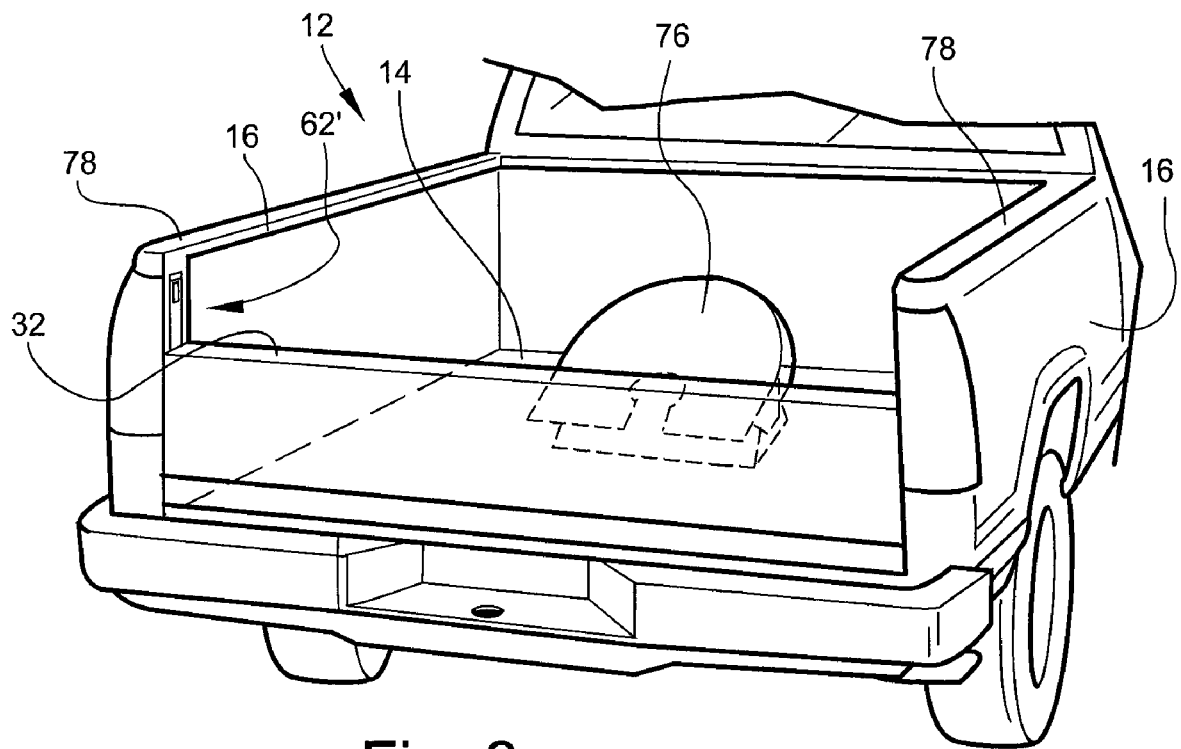
FIG. 8 is a perspective view of tailgate fixed in a lowered position.
Figure 9:
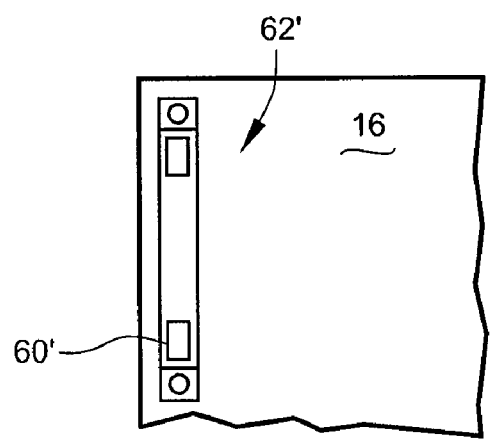
FIG. 9 is a side view of an alternative latch for use with the tailgate of FIG. 1.

In some cases, it may be desirable to pull a "gooseneck"-style trailer (not shown) which connects to "fifth wheel" type hitch 76 mounted on the floor 14 of the bed 12 (see FIG. 8). Often, a conventional tailgate would interfere with such a trailer in the open position. Accordingly, the tailgate 18 may optionally be arranged so that it can be latched in partially-retracted position as shown in FIG. 8. To accomplish this, a pair of alternative latch plates 62' (shown in FIG. 9), each with an additional opening 60' in a lowered position, are mounted on the sidewalls 16 of the bed 12. The tailgate 18 may then be pushed into a partially-retracted position as it is closed, and the latch bolts 34 will engage the additional openings 60'. This holds the tailgate 18 in the lowered position shown in FIG. 8, where its top edge 32 is substantially lower than a top edge 78 of the sidewalls 16.

Optionally, the tailgate 18 may be retractable in the closed or upright position. To accomplish this, a pair of alternative latch plates 62" (shown in FIG. 10) each with a single vertically elongated opening 60", would be mounted on the sidewalls 16 of the bed 12. If force should be applied to the tailgate 18, for example by interference with a "gooseneck" of a trailer, the tailgate 18 can collapse into a retracted position so that its total length is less than the extended length, as described above.

The foregoing has described an impact absorbing tailgate. While specific embodiments of the present invention have been described, it will be apparent to those skilled in the art that various modifications thereto can be made without departing from the spirit and scope of the invention. Accordingly, the foregoing description of the preferred embodiments of the invention and the best mode for practicing the invention are provided for the purpose of illustration only.

What is claimed is:

1. A vehicle tailgate, comprising:
   a lower section carrying pivots adapted to be mounted to a vehicle bed;
   an upper section slidingly mounted to the lower section, so as to be able to move along an axis between an extended position and a retracted position relative to the lower section; and
   a biasing mechanism resiliently urging the upper section into the extended position, so as to permit the upper section to move towards the retracted position when a predetermined external force is applied to the upper section, and to return the upper section to the extended position when the external force is removed, wherein the position of the upper section along the axis between the extended and retracted positions is solely determined by the balance between any external force applied to the upper section along the axis and the action of the biasing mechanism.

2. The tailgate of claim 1 further comprising a retractable latch bolt carried by the upper section.

3. The tailgate of claim 1 wherein the upper section has a larger cross-sectional area than the lower section and is arranged so as to slide over the lower section in a telescoping manner.

4. The tailgate of claim 1 wherein the predetermined force is about 60 lbs. to about 100 lbs.

5. The tailgate of claim 1 further comprising at least one support column mounted between the upper and lower sections, the support column including:
   an outer tube;
   an inner tube received in the outer tube for sliding motion; and
   a spring mounted between the inner and outer tubes and arranged to urge the support column towards an extended position.

6. The tailgate of claim 5 wherein the one of the inner and outer tubes includes a pin which engages a longitudinal slot in the other of the inner and outer tubes, the slot having a length selected so as to limit the motion of the upper section to a predetermined stroke.

7. The tailgate of claim 6 wherein the predetermined stroke is about 6 inches.

8. The tailgate of claim 5 wherein the support columns are mounted between upper and lower reinforcing rails carried by the upper and lower sections, respectively.

9. The tailgate of claim 1 further comprising an electrical switch carried by the tailgate and arranged to be operated by relative motion of the upper and lower sections.

10. A vehicle bed assembly, comprising:

a pair of spaced-apart sidewalls;

a floor extending between the sidewalls; and a tailgate, comprising:

a lower section carried by the sidewalls so as to be pivotable between an upright, closed position, and a generally horizontal open position;

an upper section slidingly mounted to the lower section, so as to be able to move between an extended position and a retracted position relative to the lower section;

a biasing mechanism resiliently urging the upper section towards the extended position, so as to permit the upper section to move towards the retracted position when a predetermined external force is applied to the upper section, and to return the upper section to the extended position when the external force is removed;

at least one latch plate mounted on one of the sidewalls, the latch plate including a first opening; and a retractable latch bolt carried by the upper section and arranged to engage the first opening of the latch plate so as to retain the tailgate in the closed position and the upper section in the extended position.

11. The vehicle bed assembly of claim 10 wherein the latch plate includes a second opening positioned lower than the first opening, and arranged such that when the latch bolt is engaged in the second opening, an upper edge of the tailgate is retained at a position substantially lower than an upper edge of the sidewalls.

12. The vehicle bed assembly of claim 10 wherein the upper section of the tailgate has a larger cross-sectional area than the lower section and is arranged so as to slide over the lower section in a telescoping manner.

13. The vehicle bed assembly of claim 10 wherein the predetermined force is about 60 lbs. to about 100 lbs.

14. The vehicle bed assembly of claim 10 further comprising at least one support column mounted between the upper and lower sections of the tailgate, the support column including:

an outer tube;

an inner tube received in the outer tube for sliding motion, and a spring mounted between the inner and outer tubes and arranged to urge the support column towards an extended position.

15. The vehicle bed assembly of claim 14 wherein the one of the inner and outer tubes includes a pin which engages a longitudinal slot in the other of the inner and outer tubes, the slot having a length selected so as to limit the motion of the upper section to a predetermined stroke.

16. The vehicle bed assembly of claim 15 wherein the predetermined stroke is about 6 inches.

17. The vehicle bed assembly of claim 10 further comprising an electrical switch carried by the tailgate and arranged to be operated by relative motion of the upper and lower sections.

18. The vehicle bed assembly of claim 17 further comprising an electrical circuit operatively connected to the electrical switch and a warning device, the circuit arranged so as to activate the warning device when the upper section is moved away from the extended position.

19. The vehicle bed assembly of claim 18 where the warning device is an aural warning device.

20. The vehicle bed assembly of claim 18 where the warning device is a visual warning device.

21. The vehicle bed assembly of claim 10 wherein the opening of the latch plate is vertically elongated so as to allow the upper section to move between the extended position and the retracted position relative to the lower section, while the tailgate is upright relative to the floor.

* * * * *